United States Patent
Batistic et al.

Patent Number: 6,041,277
Date of Patent: Mar. 21, 2000

[54] METHOD OF IMPROVING THE CONTROL CHARACTERISTICS OF AN ANTILOCKING SYSTEM (ABS)

[75] Inventors: Ivica Batistic, Frankfurt am Main; Robert Schmidt, Rennerod, both of Germany

[73] Assignee: ITT Maufacturing Enterprises, Inc., Wilmington, Del.

[21] Appl. No.: 09/011,824
[22] PCT Filed: Apr. 7, 1996
[86] PCT No.: PCT/EP96/02950
  § 371 Date: Aug. 7, 1998
  § 102(e) Date: Aug. 7, 1998
[87] PCT Pub. No.: WO97/08030
  PCT Pub. Date: Mar. 6, 1997
[51] Int. Cl.[7] .................................................. B60T 8/00
[52] U.S. Cl. ........................... 701/71; 701/78; 180/197
[58] Field of Search .......................... 701/71, 74, 75, 701/78, 79, 80; 180/197

[56] References Cited

U.S. PATENT DOCUMENTS

| | | | |
|---|---|---|---|
| 4,923,255 | 5/1990 | Braschel et al. | 303/97 |
| 5,357,434 | 10/1994 | Zimmer et al. | 701/71 |

FOREIGN PATENT DOCUMENTS

| | | |
|---|---|---|
| 0341866 | 11/1989 | European Pat. Off. . |
| 2616228 | 11/1977 | Germany . |
| 1655454 | 1/1979 | Germany . |
| 3610186 | 10/1987 | Germany . |
| 3715103 | 11/1987 | Germany . |
| 4025045 | 2/1991 | Germany . |
| 4003327 | 8/1991 | Germany . |

*Primary Examiner*—Tan Nguyen
*Attorney, Agent, or Firm*—Rader, Fishman & Grauer PLLC

[57] ABSTRACT

To improve the control behavior of an ABS system, more particularly, to suppress the unwanted effects of individual disturbances in the road surface, when subsequent to a partial braking operation an anti-lock control operation commences on a front wheel and the acceleration of the controlled wheel detected is in excess of a predetermined limit value, a quotient ($Q_{1,2}$) is calculated from the maximum brake slip and the duration of pressure reduction until the reacceleration of the front wheel concerned. As soon as this quotient ($Q_{1,2}$) exceeds a predetermined limit value ($Q_{grenz}$), this is taken as the indicator of a disturbance. Therefore, the braking pressure on the wheel where the single disturbance occurs is increased in the subsequent stable phase until the acceleration falls below a predetermined limit value.

5 Claims, 3 Drawing Sheets

METHOD OF IMPROVING THE CONTROL CHARACTERISTICS OF AN ANTILOCKING SYSTEM (ABS)

BACKGROUND OF THE INVENTION

The present invention relates to a method of improving the control behavior of an ABS system.

Electronically controlled anti-lock systems (ABS) are state of the art and customary on the market in many different designs. The most important or exclusive input quantity for braking pressure control is the rotational behavior of the individual vehicle wheels which is measured by wheel sensors. A vehicle reference speed is produced by logically combining the measured quantities. The vehicle reference speed is used instead of the actual vehicle speed as a reference quantity to define the wheel slip and other control quantities and, thus, as a reference quantity for braking pressure control during an anti-lock control operation.

It is well known and can be easily observed that the control of an anti-lock system (ABS) responds in some situations although there is no reason for response. One example is the triggering of a control operation by a so-called single disturbance, i.e., by a major road surface disturbance due to a depression or a pothole, a threshold, or the like. If such a disturbance occurs in the partial braking range, i.e., during an uncontrolled braking operation, the effects of the disturbance will at least irritate the driver. Also, the major pressure relief or pressure reduction due to the wheel deceleration results in a reduced deceleration which is disadvantageous.

Therefore, an object of the present invention is to provide an improved control behavior of an ABS system and, more particularly, to suppress the unwanted effects of single disturbances in the road surface.

SUMMARY OF THE INVENTION

The present invention is based on the principle that defined criteria and data, which can be acquired from the wheel rotational behavior, are an indicator of single road surface disturbances, and that the single disturbances can be counteracted by an 'additional' pressure increase. Therefore, according to the present invention, upon the commencement of an anti-lock control operation subsequent to a partial braking operation and the occurrence of an acceleration or reacceleration of the controlled wheel which is in excess of a predetermined limit value, a quotient is calculated from the maximum brake slip of the wheel and the duration of pressure reduction due to this brake slip until the reacceleration of the wheel, and the exceeding of a predetermined limit value of this quotient is assessed as identification of a single disturbance. Thereafter, according to the method of the present invention, the braking pressure on the wheel where the single disturbance occurred is increased until the acceleration falls below a predetermined limit value with a steeper braking pressure gradient compared to a normal control operation.

The method of the present invention is used especially for the front-wheel control. The precondition is a defined minimum deceleration caused by the partial braking operation. When the control system includes yaw torque management, such management is deactivated while single disturbances are 'overcome'.

Further details of the present invention can be seen in the following description of embodiments making reference to the accompanying drawings.

DETAILED DESCRIPTION OF THE DRAWINGS

Figure 1:
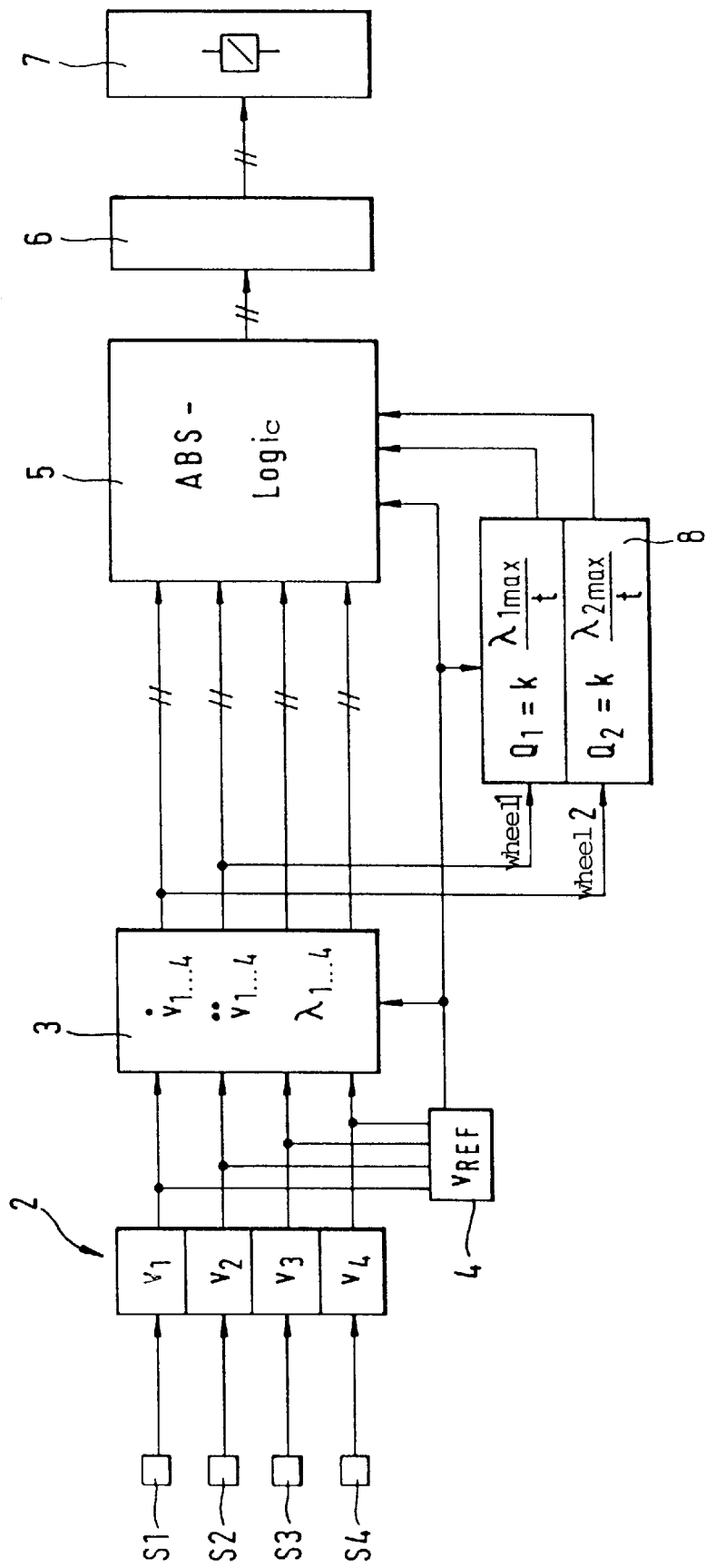
FIG. 1 is a wiring diagram to illustrate the principle of the improved control according to the method of the present invention.

FIG. 1 shows the essential electric and electronic components of a brake system with wheel lock control or an anti-lock system (ABS). The drawing is used to explain the operation of an ABS and the way the method of the present invention functions. Each vehicle wheel in this embodiment includes a wheel sensor S1 to S4 which issues a signal representative of the rotational behavior of the respective wheel. In a conditioning circuit 2, corresponding wheel speed signals $v_1$ to $v_4$ are produced in the form of purely electrical signals or data when further processing in the ABS system is effected by programmed circuits, such as processors, microprocessors, microcontrollers, and the like. This is not important when the principal operation of the present invention is explained.

In a subsequent signal or data processing circuit 3, the signals $v_1$ to $v_4$, $\ddot{v}_1$ to $\ddot{v}_4$, and slip signals $\lambda_1$ to $\lambda_4$ required for the control are produced from the wheel speeds $v_1$ to $v_4$. It is known that the vehicle speed is required to determine the slip, or a vehicle reference speed $v_{REF}$ which is produced by logically combining the conditioned wheel speeds $v_1$ to $v_4$ by way of the combining circuit 4. From signals and data determined in the circuit 3 (if necessary, by taking into account additional data), valve-actuating signals are calculated in an ABS logic circuit 5 to modulate the pressure in the individual wheel brakes in the desired manner by way of a valve actuation control 6 in a valve block 7. Valve block 7 includes actuators such as electromagnetically operable hydraulic valves.

To implement the method of the present invention, an additional circuit 8 is provided in the embodiment shown wherein the calculations are effected in order to improve the control behavior of the ABS.

Exclusively the data about the front wheels are processed in the additional circuit 8 in the embodiment shown.

A quotient $Q_{1,2}$ is produced for each individual wheel according to the relation $$Q_{1,2} = k \times \frac{\lambda \max}{\Delta t} = \frac{(v_{REF} - V_{R1,2})\max}{\Delta t}$$

This quotient is used to identify single road surface disturbances. The data are assessed as follows:

If a partial braking operation is performed, i.e. a 'normal' braking operation without intervention by the ABS control, if the vehicle deceleration in this partial braking operation is in excess of a predetermined minimum value of e.g. 0.1 to 0.2 g ('g' referring to the gravitation constant), and if an anti-lock control operation is triggered in this situation, the quotient calculation for this special front wheel becomes important. This is because if the reacceleration of the wheel under observation is unusually high or is in excess of a limit value in the order between 3 g and 6 g ('4 g' is the limit in the embodiment of FIG. 2), the quotient of the slip of the front wheel is divided by the time Δt of the pressure reduction on this front wheel, and this quotient is assessed for identifying single disturbances. The pressure reduction time Δt is in the order between 20 and 40 msec.

When the quotient $Q_{1,2}$ exceeds a predetermined limit value (and a constant factor k depending on the system is still taken into consideration) the braking pressure on a front wheel, if reacceleration is in excess of a high predetermined limit value $Q_{grenz}$ of 15 g, for example, will be increased immediately after exceeding of the limit acceleration until the acceleration falls short of the limit again. In a brake system with a pulsed actuation of the valves, the braking pressure in the wheel brake of this front wheel is introduced in an unpulsed manner in this situation.

Following the control operation described, which is initiated by single road surface disturbances, the braking pressure on the respective front wheel will be increased in the subsequent stable phase with a braking pressure increase gradient which is much steeper compared to a normal braking operation, i.e., faster than 'normally'. This pressure increase takes place in a period of 30 to 100 msec, for example.

The quotient '$Q_{1,2}$' for each of the two front wheels is produced in the circuit 8. Also, the marginal conditions described are examined in circuit 8. The assessment of the quotient with respect to the braking pressure modulation is effected by the ABS logic circuit 5. If data processing (as is common use nowadays) is on the basis of programmed circuits, microcomputers, etc., the functioning of cirucit 8 is achieved by a corresponding configuration of the controller program.

When the ABS control circuit or the ABS control program includes a so-called yaw torque management, the yaw torque management is favorably deactivated when single road surface disturbances are identified in the above-mentioned fashion and a control operation for suppressing the effects of these single disturbances is initiated.

Figure 2:
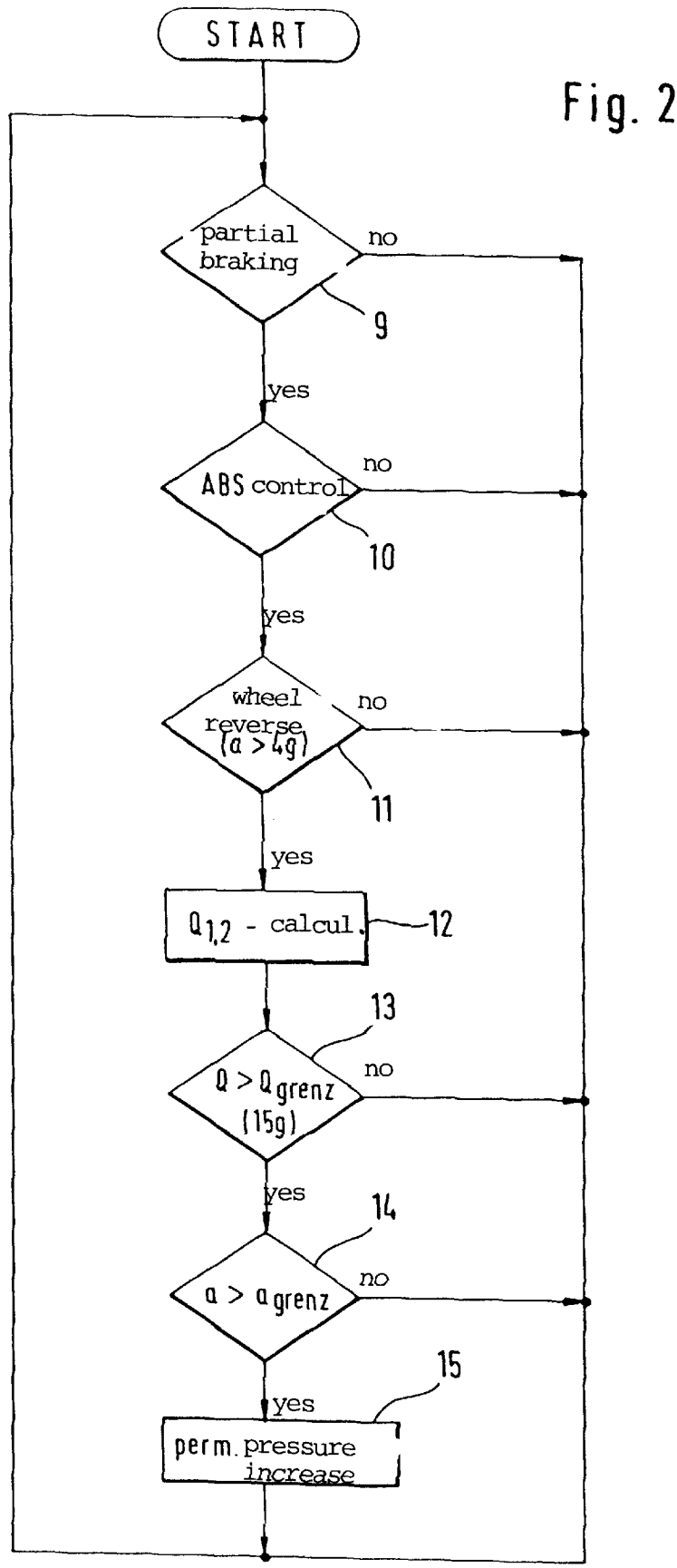
FIG. 2 is a flow chart showing the operation.

FIG. 2 shows in the flow chart the data flow and process of decisions on which the method of the present invention is based.

After the START of the computer program shown herein, it is initially found out (represented by the lozenge 9), whether a partial braking operation exists. If this is the case and if an ABS control operation (lozenge 10) follows, in a wheel acceleration or reacceleration which is in excess of a predetermined limit value of 4 g, for example, the quotient '$Q_{1,2}$' is calculated by operation 12 individually for each wheel, or the quotient '$Q_{1,2}$' is assessed. When '$Q_{1,2}$' is in excess of a predetermined limit value which amounts to 15 g in the present embodiment, an increased or permanent pressure increase in the wheel brake of the wheel concerned is initiated by operation 15, via a branch 13, as long as the reacceleration a is in excess of a predetermined limit value $a_{grenz}$ (lozenge 14).

Each NEGATION leads back to the start of the loop shown.

Figure 3:
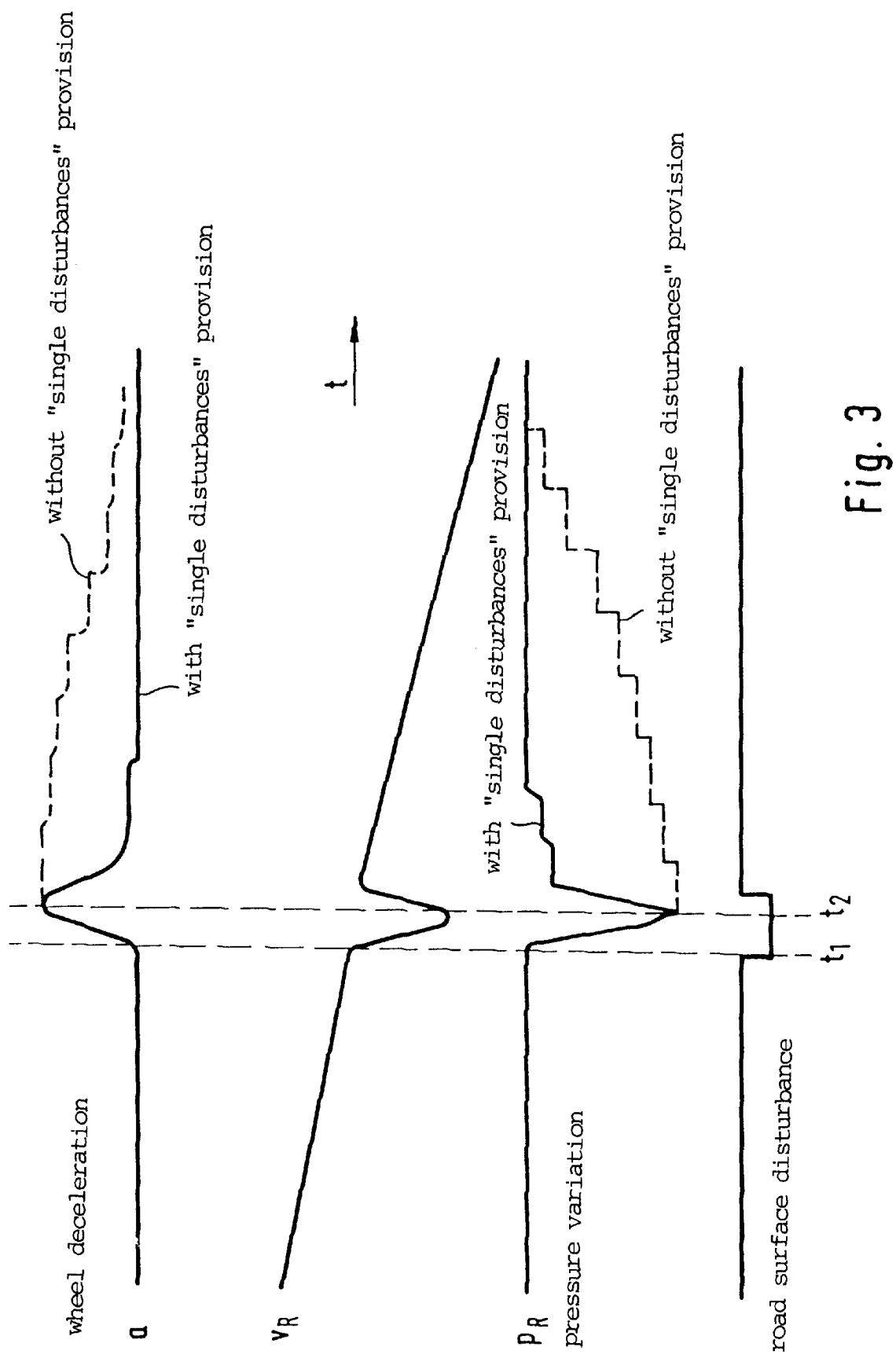
FIG. 3 is a diagram showing the variation of the vehicle deceleration, the wheel speed and the braking pressure in the associated wheel as a result of single disturbances in the road surface.

The embodiment of FIG. 3 shows a typical driving situation on a road surface with a "single road surface disturbance". What is shown as a function of time is the wheel deceleration a, the speed $V_R$ of the front wheel experiencing the single disturbance, the pressure variation $p_R$ in the wheel brake of the corresponding wheel and, finally, the occurrence of the single disturbance as a function of time. The variation of the wheel deceleration and the pressure in applying the method of the present invention and, in dotted lines, the variation in a conventional ABS system is shown.

At time $t_1$, a front wheel of the vehicle under consideration comes across a pothole or a road surface with a single disturbance. The vehicle is in a partial braking situation as can be seen from the variation of the wheel pressure $p_R$ and the wheel speed $V_R$. The speed of $V_R$ of the front wheel considered is greatly reduced due to the pothole. Great wheel deceleration a occurs. The braking pressure $p_R$ in the wheel brake is reduced by the commencement of the ABS control until time $t_2$. According to the present invention, the occurrence of a single road surface disturbance is identified at time $t_2$, for what reason a quick reincrease of the braking pressure $p_R$ in the front-wheel brake concerned is caused in the subsequent stable phase.

It can be seen in the dotted curve which shows the pressure variation and the wheel deceleration without the special treatment when the single disturbance is identified that a major improvement of the control behavior is achieved by the method of the present invention. This is because the braking pressure control commencing time $t_2$ avoids a considerable loss in braking effectivity which is caused by the front wheel being briefly unbraked due to the road surface disturbance. Yaw torque management which, as is known, would also reduce the braking pressure on the second wheel which is not concerned in order to prevent dangerous yaw torques, would still enhance the temporary reduction in the braking effect as a consequence of single disturbances. Thus, according to the present invention, major improvement is achieved by simple provisions.

What is claimed is:

1. A method of improving the control behavior of an anti-lock system of a vehicle with a plurality of wheels, each wheel being equipped with a wheel brake with an individually contolable braking pressure, wherein the rotational behavior of the individual vehicle wheels is measured and a vehicle reference speed is produced by logically combining the measured quantities, the vehicle reference speed being used as a reference quantity to determine the wheel slip and other control quantities and as a reference quantity for braking pressure control or braking pressure modulation, wherein, upon the commencement of an anti-lock control operation including a brake pressure reduction subsequent to an uncontrolled braking operation, and upon the occurrence of an acceleration of at least one controlled wheel which is in excess of a predetermined limit value, a quotient Q is produced of a maximum brake slip $\lambda_{max}$ of the wheel during the anti-lock brake operation and the duration Δt of pressure reduction until the wheel reaccelerates, according to the relation $$Q_{1,2} = k * \frac{\lambda \max}{\Delta t} = \frac{(v_{REF} - V_{R1,2})\max}{\Delta t}$$

and the exceeding of a predetermined limit value of this quotient is assessed as an indicator of single disturbances, and wherein, upon detection of such a single disturbance, the braking pressure on the wheel where the single disturbance occurred is increased until the wheel deceleration falls short of a predetermined limit value.

2. A method as claimed in claim 1, wherein the method is used exclusively to improve the control of frontwheels.

3. A method as claimed in claim 1, wherein the identification of single disturbances is only activated when the vehicle deceleration during the uncontrolled braking operation exceeds a predetermined limit value.

4. A method as claimed in claim 1, wherein in a stable phase, which follows the pressure reduction caused by the identification of single disturbances, the braking pressure on the respective wheel builds up with a steeper pressure increase gradient compared to a normal control mode.

5. A method as claimed in claim 1, wherein in a control system where the control of the front-wheel braking pressure is modified by a so-called yaw torque management, yaw torque management is deactivated for a predetermined time, more particularly, for the duration of a control cycle, when single disturbances are identified.

* * * * *